L. C. BAYLES.
FRONT HEAD CONSTRUCTION FOR SELF ROTATING HAMMER DRILLS.
APPLICATION FILED JUNE 1, 1914.
1,126,942.
Patented Feb. 2, 1915.
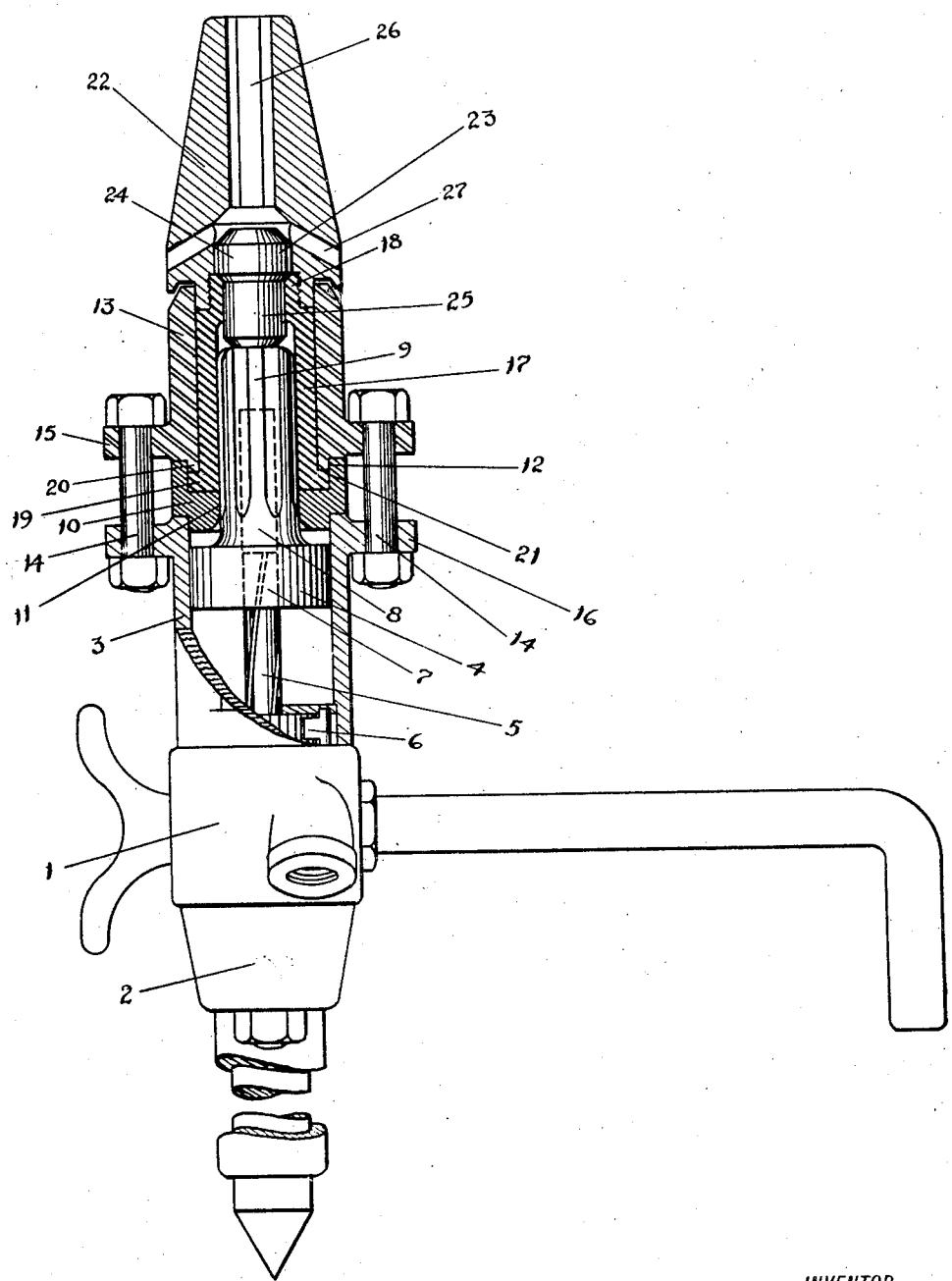
WITNESSES:
INVENTOR
ATTORNEY

UNITED STATES PATENT OFFICE.

LEWIS C. BAYLES, OF EASTON, PENNSYLVANIA, ASSIGNOR TO INGERSOLL-RAND COMPANY, OF JERSEY CITY, NEW JERSEY, A CORPORATION OF NEW JERSEY.

FRONT-HEAD CONSTRUCTION FOR SELF-ROTATING HAMMER-DRILLS.

1,126,942.

Specification of Letters Patent.

Patented Feb. 2, 1915.

Application filed June 1, 1914. Serial No. 843,150.

*To all whom it may concern:*

Be it known that I, LEWIS C. BAYLES, a citizen of the United States, residing at Easton, in the county of Northampton and State of Pennsylvania, have invented a certain new and useful Improvement in Front-Head Construction for Self-Rotating Hammer-Drills, of which the following is a specification.

This invention relates to self rotating hammer drills, and more particularly to a front head construction for drills of this type for use in stoping or other drilling where it is necessary to drill vertical holes in the roof of a stope or entry.

The object of this invention is to provide a front head construction for drills of this type which will prevent dust from the hole from penetrating into the moving parts of the drill when it is used in vertical or nearly vertical drilling.

With this object in view a front head construction has been devised, a practical embodiment of which is represented in the accompanying drawing.

As shown, the drill comprises a head block 1, to one side of which is secured an air feed 2 and to the other side of which is secured a drill cylinder 3 in which reciprocates a piston 4, the movement of which is governed by any desired form of valve mechanism, (not shown).

The piston is given a step by step rotation by means of a fluted rifle bar 5 provided with ordinary ratchet mechanism 6. This rifle bar 5 slides in a bore 7 in the head of the piston which bore is provided with grooves which are engaged by flutes on the rifle bar 5.

On the forward end of the piston is a hammer bar extension 8, which is provided with straight flutes 9. Fitting into the forward end of the cylinder 3 is a cylinder head 10. In the rearward portion of the cylinder head 10 is a bore 11 through which the hammer bar extension 8 projects. Forward of this is a larger bore 12. Forward of the cylinder head 10 is a front head 13 which is secured by bolts 14 passing through lugs 15 to the cylinder 3 which is also provided with lugs 16 through which the bolts 14 pass.

Rotatably mounted in the front head 13 is a sleeve 17 which forms the rearward portion of a drill chuck 18.

The rear end of the front head 13 is provided with a rear extension 20 which also sets into the bore 12, the rearward face 21 of which the flange 19 engages to prevent forward motion of the sleeve 17. The sleeve 17 is bored out to receive the hammer bar extension of the piston and is provided on its inner surface with grooves engaging the straight flutes 9.

Threaded to the sleeve 17 is a nose piece 22 of larger diameter than the sleeve, this nose piece forming the forward portion of the drill chuck 18. The thread is arranged in the same direction as the spiral flutes on the rifle bar 5 so that rotation of the piston tends to tighten the forward portion 22 to the chuck. The rear face of this nose piece 22 overlaps the front end of the front head 13 and prevents any dust falling on the front head of the drill from entering the drill cylinder at the joint between these parts. The nose piece 22 is bored out to receive the head 23 of the anvil block 24, the shank 25 of which projects through a smaller bore into the interior of the shank portion 17 of the chuck so that it is struck by the hammer bar extension of the piston 4. The threaded joint between the sleeve 17 and the nose piece 22 comes at such a point that the anvil block 24 can be removed.

An angular longitudinal aperture 26 is provided for the reception of the drill steel, (not shown), the rear end of which can then be struck by the anvil block 24. Rearwardly inclined passages 27 are provided through the forward portion of the chuck from the anvil block bore so that any dust penetrating into the bore along the shank of the drill can easily escape and not work into the cylinder.

The operation of the device is as follows: The rotary movement of the piston caused by the fluted rifle bar 5 will be communicated to the drill chuck 18 by means of the straight flutes 9 of the hammer bar extension of the piston, causing relative rotation between the forward portion 22 and the front head 13. With drills of ordinary construction the dust falling from the hole works down into the moving parts of the drill, quickly resulting in destructive wear of the drill. In the present form the joint between the chuck and front head is entirely covered by the overlapping rear end of the nose piece of the chuck. By this means, and also by the rearwardly inclined passages 110 from the anvil bore, dust is entirely prevented from entering the cylinder and affecting the moving parts.

While the chuck is here shown as rotated by the rotary movement of the piston, communicated to the chuck by the fluted forward extension of the piston, it is obvious that other means may be employed without invention for directly or indirectly rotating the chuck and it is therefore to be understood that the present showing and description discloses only one specified modification of my invention, and other forms and modifications are included in the spirit and scope of the invention as expressed in the claims.

What I claim is:—

1. In a fluid operated percussive drill, a cylinder, a front head secured to said cylinder, a drill steel receiving chuck rotatably mounted in said front head, said chuck having a rearward portion provided with a flange engaging a rearward face of said front head and a forward portion of larger diameter overlapping the forward end of said front head, means to secure said chuck portions together, and means for rotating said chuck.

2. In a fluid operated percussive drill, a cylinder, a front head secured to said cylinder, a drill bit chuck having a rearward portion rotatably mounted in said front head, and provided with a flange portion engaging a rearward face of said front head, and a forward portion of larger diameter overlapping the front end of said front head, and having a drill bit receiving bore, means for securing said chuck portions together, and means for rotating said chuck.

3. In a fluid operated percussive drill, a cylinder, a front head, a piston in said cylinder having a fluted hammer extension, a chuck sleeve rotatably mounted in said front head and having a flange engaging a rearward face of said front head, said sleeve having an internal bore provided with grooves engaged by the flutes of said hammer extension, a nose piece overlapping the forward end of the front head, said nose piece having a polygonal drill bit receiving bore, and a larger bore in the rearward portion, an anvil block in said larger bore having a shank projecting into said chuck sleeve to receive the impact of said hammer extension, means to secure said chuck sleeve and said nose piece together and means for rotating said piston.

In testimony whereof, I have hereunto set my hand.

LEWIS C. BAYLES.

Witnesses:
 FRED. M. SLATER,
 ARTHUR SMITH.